United States Patent [19]

Muto et al.

[11] 4,367,520

[45] Jan. 4, 1983

[54] METHOD AND APPARATUS FOR CONTROLLING PULSE WIDTH MODULATION INVERTER CIRCUIT

[75] Inventors: Nobuyoshi Muto; Yasuo Matsuda; Shigeki Morinaga, all of Hitachi; Yasuyuki Sugiura, Takahagi, all of Japan

[73] Assignee: Hitachi, Ltd., Tokyo, Japan

[21] Appl. No.: 221,320

[22] Filed: Dec. 29, 1980

[30] Foreign Application Priority Data

Jan. 11, 1980 [JP] Japan ................................. 55/1308

[51] Int. Cl.³ ............................................ H02M 1/12
[52] U.S. Cl. .................................... 363/41; 318/811
[58] Field of Search .................................. 363/40–43; 318/811

[56] References Cited

U.S. PATENT DOCUMENTS 3,662,247  5/1972  Schieman ............................. 363/41

FOREIGN PATENT DOCUMENTS 53-47806  6/1978  Japan ..................................... 363/41
1380730  1/1975  United Kingdom ................. 363/42

OTHER PUBLICATIONS

Proceedings of the IEE, vol. 122, No. 11, pp. 1279–1285, Nov. 1975.
IEEE Transactions on Industrial Electr. and Control Instrum., vol. IECI-27, No. 3, pp. 201–207, Aug. 1980.

Primary Examiner—William H. Beha, Jr.
Attorney, Agent, or Firm—Antonelli, Terry & Wands

[57] ABSTRACT

A pulse width modulation inverter in which a staircase wave signal is used as the modulating wave. The number M of the stair steps of the staircase wave signal is set at a given integer in a range defined by $2 \leq M \leq (N-3)/2$ where N represents the number of the carrier waves appearing during a half period of the staircase wave and an odd integer not smaller than 7.

2 Claims, 8 Drawing Figures

METHOD AND APPARATUS FOR CONTROLLING PULSE WIDTH MODULATION INVERTER CIRCUIT

BACKGROUND OF THE INVENTION

1. Field of the Invention

The present invention relates to a method of controlling a pulse width modulation or PWM inverter and an apparatus for carrying out the method. In particular, the invention concerns a method and apparatus for controlling a pulse width modulation of the PWM inverter in which a staircase wave is made use of as a modulating wave.

2. Description of the Prior Art

As one of the methods of controlling PWM inverters, there has heretofore been known a method in which a triangular wave is used as a carrier wave while a rectangular wave is used as the modulating wave, as is disclosed in the specification of U.S. Pat. No. 3,663,247, issued May 9, 1972 (in particular refer to FIG. 4f to FIG. 4k and associated descriptions). According to this prior art method, the triangular wave and the rectangular wave are compared with each other in respect of the voltage level. When the triangular wave is at a lower level than that of the rectangular wave, a firing pulse is produced. Otherwise, the firing pulse is not produced. The pulse width modulation of the firing pulse is effected by increasing or lowering the voltage level of the rectangular wave. This is a typical one of the hitherto known methods of controlling the PWM inverter.

The method of controlling the PWM inverter in which the rectangular wave is used as the modulating wave is certainly advantageous in that the modulating wave generator circuit can be implemented in a relatively simplified configuration. However, this method suffers a drawback that the output signal from the inverter is inflicted with numerous harmonics.

Another method of controlling the PWM inverter is also known from Japanese Laid-Open Patent Application No. 80526/1974 (in particular, FIG. 2), for example. According to this known method, a staircase wave is used as the modulating wave in place of the rectangular wave. The number of the stair steps of the staircase wave can be expressed by $(N-1)/2$, where N represents the number of the carrier waves appearing during a half period of the staircase wave.

The method in which the staircase wave is used as the modulating wave is advantageous in that the harmonic components are reduced. However, for an increased value of N, the number M of the stair steps has to be necessarily increased, which brings about the disadvantage that the modulating wave generator circuit becomes correspondingly complicated.

SUMMARY OF THE INVENTION

An object of the present invention is to provide an improved method of controlling the PWM inverter which allows the modulating wave generator circuit to be implemented in a simplified structure and additionally the harmonic components contained in the output power of the inverter to be significantly reduced.

Another object of the invention is to provide an improved apparatus for carrying out the method described above.

According to a general aspect of the invention, a staircase wave is made use of as the modulating wave. The number M of the stair steps of the staircase wave is selected to be an integer in the range of $2 \leq M \leq (N-3)/2$ where N represents the number of the carrier waves occurring during a half period of the staircase wave and an odd number not smaller than 7 rather than $(N-1)/2$.

In the PWM inverter control according to the invention, it is possible to select the number M of a smaller value even when the number N is large. This means that the modulating wave generator circuit can be realized in a simplified structure. Further, since the harmonic components contained in the output power of the inverter will scarcely be increased, as will be elucidated hereinafter, the effect of reducing the harmonics attained by selecting M to be equal to $(N-1)/2$ can be retained substantially unaffected.

DESCRIPTION OF THE PREFERRED EMBODIMENTS

Figure 1:
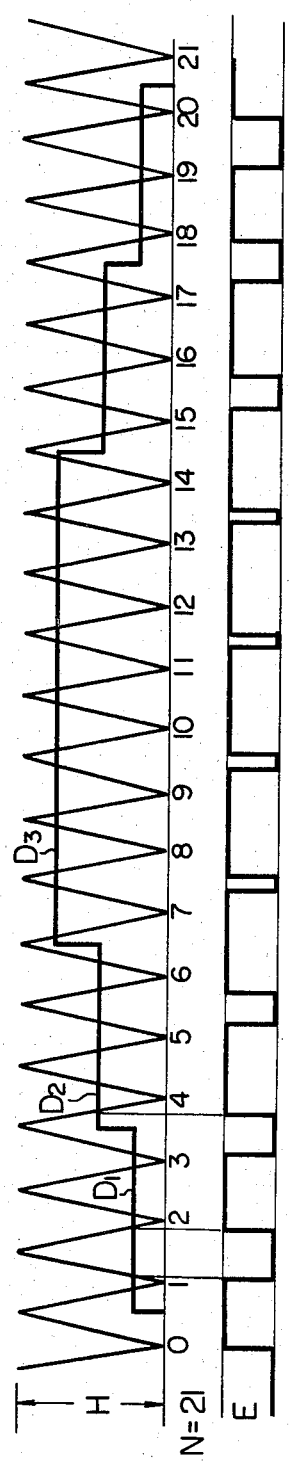
FIG. 1 shows a waveform diagram in which the number N of the carrier waves during a half period of a staircase wave is selected equal to 21 while the number of the stair steps of the staircase wave is selected equal to 3.

FIG. 1 shows a waveform diagram to illustrate the principle of the invention. The number N of the carrier waves appearing during a half period of the staircase wave is selected equal to 21, while the number M of the stair steps of the staircase wave is selected equal to 3, by way of example. When $N=21$, the number M may be selected to be equal to a given interger in a range of 2 to 9 from the aforementioned condition that $2 \leq m \leq (N-3)/2$. In the case of this illustrated example, M is selected equal to 3 for convenience' sake. In FIG. 1, $D_1$ to $D_3$ denote three stair levels. By comparing the stair levels $D_1$ to $D_3$ with the level of the carrier wave (triangular wave), a firing pulse signal E is obtained. The pulse width modulation of the pulse signal E is effected by varying the amplitude ratio $K_H (0 \leq K_H \leq 1)$ between the crest value H of the triangular carrier wave and the stair level $D_3$ of the staircase wave signal. In this connection, the ratio of $D_1:D_2:D_3$ is maintained constant. This ratio can be determined in the following manner. Namely, when the firing pulse signal E is developed into Fourier series, the n-th order harmonic component $E_n$ can be given by the following expression on the assumption that $N=21$.

$$E_n = \frac{2E_D}{n\pi}\left\{1 - 4\left(\sin\frac{n\pi}{14}\cdot\sin\frac{n\theta_1}{2} + \sin\frac{n\theta_2}{2}\cdot\sin\frac{n\theta_3}{2} + \right.\right.$$

$$\sin\frac{11n\pi}{42}\cdot\sin\frac{n\theta_4}{2} + \sin\frac{5n\pi}{14}\cdot\sin\frac{n\theta_5}{2} +$$

$$\left.\left.\sin\frac{19n\pi}{42}\cdot\sin\frac{n\theta_5}{2}\right)\right\}$$

where $$\theta_1 = \frac{\pi}{21}\left(1 - K_H\cdot\frac{D_1}{D_3}\right)$$

$$\theta_2 = \frac{\pi}{21}\left\{7 - K_H\left(\frac{D_2 - D_1}{2D_3}\right)\right\}$$

$$\theta_3 = \frac{\pi}{21}\left\{1 - K_H\left(\frac{D_2 + D_1}{2D_3}\right)\right\},$$

$$\theta_4 = \frac{\pi}{21}\left(1 - K_H\cdot\frac{D_2}{D_3}\right)$$

$$\theta_5 = \frac{\pi}{21}(1 - K_H)$$

$K_H = D_3/H$, and $E_D$ = input voltage to the inverter.

Figure 2:
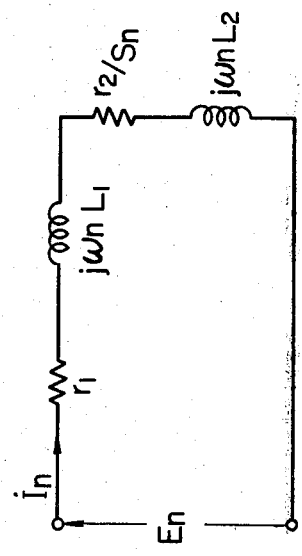
FIG. 2 shows an equivalent circuit of an induction motor driven at a high frequency.

Further, copper loss $W_n$ due to the n-th order harmonic current $I_n$ can be expressed as follows:

$$W_n = \Sigma |I_n^2|(r_1 + r_2)$$

$$= \Sigma \frac{E_n^2(r_1 + r_2)}{(r_1 + r_2)^2 + \omega_n^2(L_1 + L_2)^2}$$

where resistances $r_1$ and $r_2$ and reactances $L_1$ and $L_2$ represent values of corresponding elements of an equivalent circuit of an induction motor shown in FIG. 2. In connection with FIG. 2, it is to be noted that excitation reactance is omitted from consideration since this factor is irrelevant to the examination of the harmonics. Further, slip $S_n$ for the n-th harmonic may be considered to be equal to 1.

For example, assuming that an induction motor of 1.5 KW to 2.2 KW is controlled so that $E_1/f_1 = \alpha$ is constant under the condition that $(L_1 + L_2)/(r_1 + r_2) \approx 2$, then $\omega_n = 2\pi n f_1 = 2\pi n (E_1/\alpha)$, and $\alpha < 3.3$ ($\approx 200$ V/60 Hz)

Accordingly,
$$W_n \propto F = \Sigma (F_n/nE_1)^2$$

where F represents a function corresponding to the copper loss $W_n$. The level ratio of the staircase wave, i.e. $D_1:D_2:D_3$ described hereinbefore is determined so that the value of the function F becomes smallest. Calculation shows that in the case of the example illustrated in FIG. 1, the function F takes approximately a minimum value when $D_1:D_2:D_3 = 0.36:0.85:1$.

Figure 3:
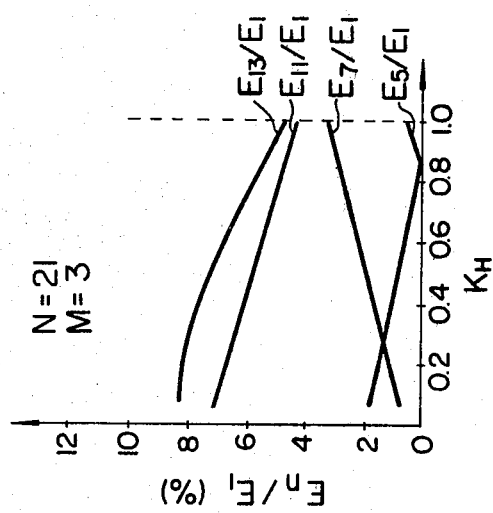
FIG. 3 graphically illustrates relationships between an amplitude ratio $K_H$ and a ratio $(E_n/E_1)$ of the n-th harmonic component $E_n$ to the fundamental wave $E_1$ in the case where $N=21$.

FIG. 3 graphically illustrates relationships between the amplitude ratio $K_H$ and the ratio $(E_n/E_1)$ of the n-th harmonic component $E_n$ to the fundamental wave $E_1$ on the assumption that $N = 21$. As can be seen from this figure, the ratio $E_n/E_1$ is as small as less than 10% in any case, which means that the output power of the inverter will be satisfactory.

From the above discussion, it will be appreciated that the control method in which the number M of the stair steps of the staircase wave is selected to be an integer in the range of $2 \leq M \leq (N-3)/2$ (in the case of the example illustrated in FIG. 1, M = 3) rather than equal to $(N-1)/2$ is very advantageous.

Figure 4:
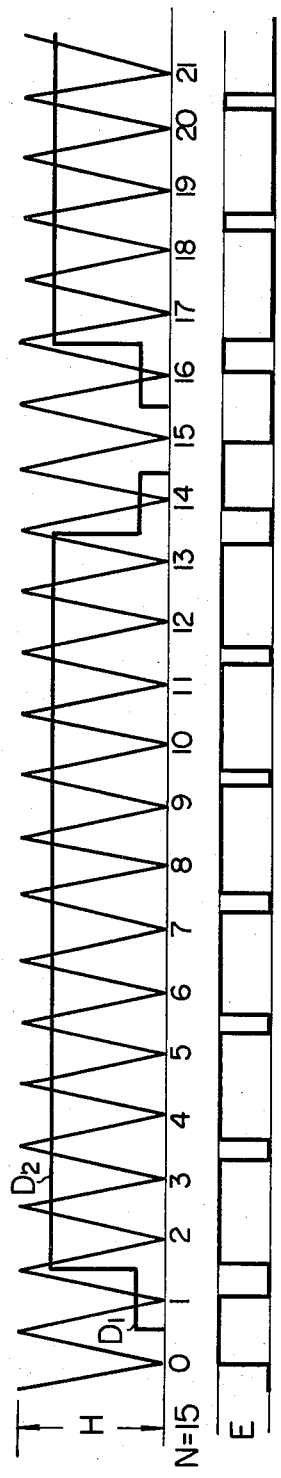
FIG. 4 is a waveform diagram similar to that of FIG. 1 in which the number N is however selected equal to 15 with M equal to 2.

FIG. 4 illustrates another example where N is selected equal to 15 with M equal to 2. Of course, M may be an integer of a group consisting of integers 2 to 6 for N = 15. In this example, M is selected equal to 2 only for convenience' sake. In this case, the value of the function F described above takes approximately a minimum value for the ratio of $D_1:D_2 = 0.25:1$ (based on the calculation assuming that $K_H = D_2/H = 0.3$).

Figure 5:
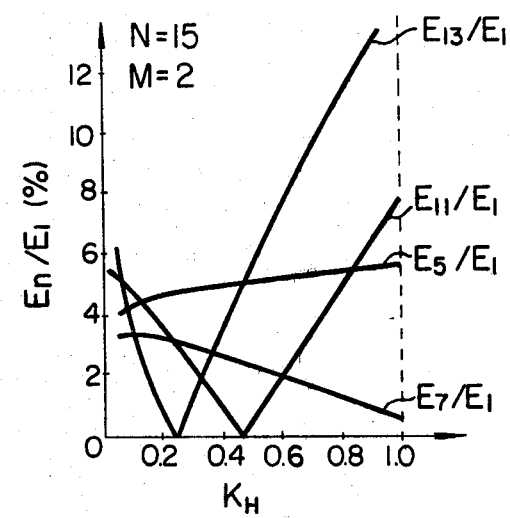
FIG. 5 is a graph similar to that of FIG. 3 where N is selected equal to 15.

FIG. 5 graphically illustrates relationships between the amplitude ratio $K_H$ and the ratio $E_N/E_1$ on the assumption that $N = 15$. As can be seen from this graph, although the ratio of the thirteenth harmonic component ratio to the fundamental wave (i.e. $E_{13}/E_1$) exceeds 10% in the range where $K_H \geq 0.7$, the ratio $E_n/E_1$ is always smaller than 10% in the range where $K_H \leq 0.7$. In this manner, when the amplitude ratio $K_H$ is selected at an appropriate value, the output power of the inverter becomes satisfactory.

Figure 6:
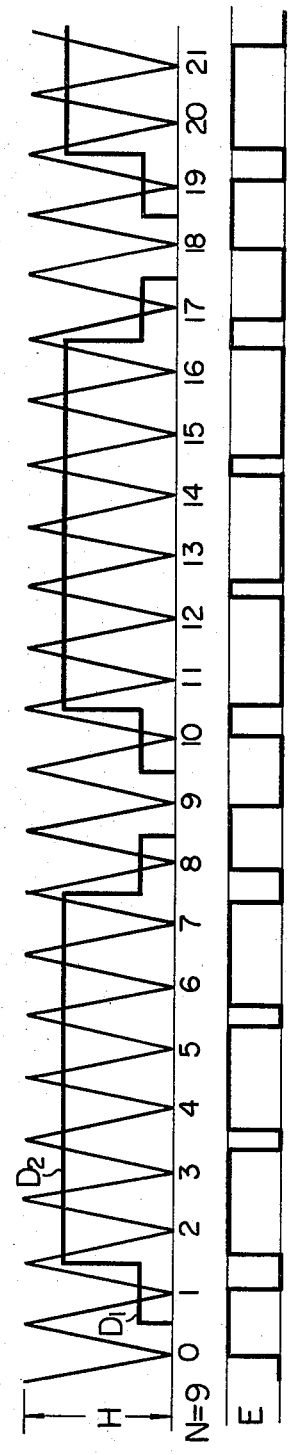
FIG. 6 is a waveform diagram similar to that of FIG. 1 except that N is selected equal to 9 with M equal to 2.

FIG. 6 shows another example in which N is selected equal to 9 with M equal to 2. In this connection, it is to be noted that for N = 9, M may be either 2 or 3. For convenience' sake, M is selected equal to 2. The aforementioned function F takes a minimum value approximately when the ratio $D_1:D_2$ is about 0.5 to 0.6.

Figure 7:
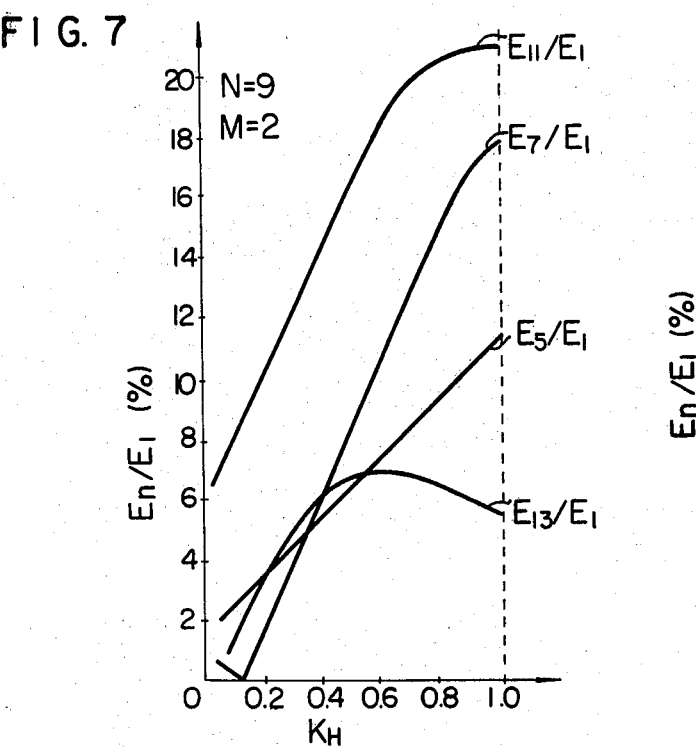
FIG. 7 is a graph similar to that of FIG. 3 where N is selected equal to 9.

FIG. 7 graphically illustrates relationships between the level $K_H$ and the ratio $E_n/E_1$ for the case where N = 9. As can be seen from this figure, the ratio of the eleventh harmonic component to the fundamental wave (i.e. $E_{11}/E_1$) exceeds 20% in the range where $K_H \geq 0.7$. However, the ratio $E_n/E_1$ remains always smaller than 10% in the range where $K_H \geq 0.2$. Thus, by selecting the amplitude ratio $K_H$ at an appropriate value, a desirable output power can be obtained from the inverter.

Figure 8:
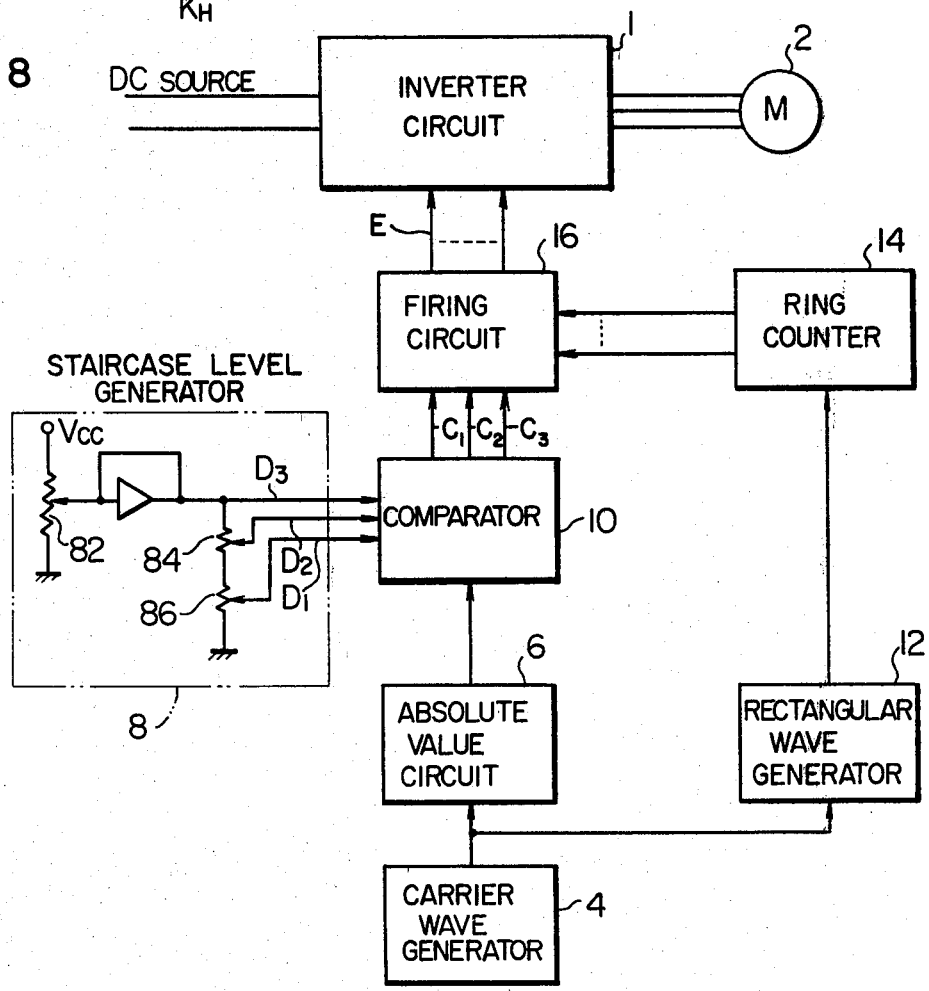
FIG. 8 shows in a block diagram an inverter control apparatus for carrying out the method according to the invention.

FIG. 8 shows an exemplary embodiment of a control apparatus for PWM inverter for carrying out the method according to the invention.

An inverter circuit 1 composed of switching elements wired in a bridge connection which per se is known in the art serves to convert a D.C. power from a D.C. power supply source into a three-phase alternating power to be supplied to an A.C. motor 2. The control apparatus for the inverter circuit 1 operates in the manner described below.

A carrier wave generating circuit 4 produces a triangular wave signal of a high frequency. An absolute value circuit 6 derives the absolute value of the triangular wave. On the other hand, a staircase level generator circuit 8 produces a plurality of staircase levels which are utilized in conjunction with the comparator 10, the ring circuit 14 and the firing circuit 16 to produce a staircase modulating wave signal of a low frequency. The number M of the staircase wave is selected equal to a given integer in a range defined by $2 \leq M \leq (N-3)/2$ where N represents the number of the carrier waves during a half period of the staircase wave and an odd integer not smaller than 7. In the case of the apparatus shown in FIG. 8, the number M is assumed be equal to 3. In other words, the staircase level generator 8 produces as the output a staircase wave having three stair levels $D_1$, $D_2$ and $D_3$. A comparator circuit 10 serves to compare the amplitude of the staircase levels from the staircase level generator 8 with that of the triangular wave to thereby produce comparison output signals $C_1$, $C_2$ and $C_3$ which respectively represent the comparisons of each of the stair levels $D_1$, $D_2$ and $D_3$ with the absolute value of the triangular wave from absolute value circuit 6. On the other hand, a rectangular wave shaper circuit 12 forms a rectangular wave signal on the basis of the triangular wave output from the carrier wave generator circuit 4. A ring counter 14 is driven by the rectangular wave signal. In this connecton, it should be mentioned that the ring counter 14 is one of 21-ary for N=21, 15-ary for N=15 and 9-ary for N=9 to define the periods for the modulating signal as shown in FIGS. 4 and 5, respectively. A firing circuit 16 selects from the comparison output signals $C_1$, $C_2$ and $C_3$ during different periods established by the ring counter 14 to provide the staircase effect shown in FIGS. 1, 4 and 5 to produce the firing pulses E. The firing circuit 16 then supplies these firing pulses to the gate electrodes of the individual switching elements of the inverter circuit.

In order to vary the pulse width of the firing pulses E, a variable resistor 82 is provided in the modulating wave generator circuit. For varying the ratio of the stair levels $D_1$, $D_2$ and $D_3$, variable resistors 84 and 86 are correspondingly adjusted. According to the invention, by virtue of the fact that the number M of the stair steps can be selected small even when N is great, the modulating wave can be generated by a simplified arrangement and is less susceptible to failures. For practical applications, the number M may be 2 or 3 without involving any inconvenience. If the number M is selected smaller, the fundamental wave voltage of the inverter becomes larger than the case where M is selected larger thereby enlarging a control range for the output voltage of the inverter to an advantage.

We claim:

1. A method of controlling a pulse width modulation inverter circuit in which firing of individual switching elements constituting said inverter circuit is controlled on the basis of a control signal derived through comparisons of a carrier wave signal with a plurality of different signal levels to produce a modulating wave signal having a staircase waveform, wherein a number M of the stair steps of said staircase waveform is selected at a given integer in a range defined by $2 \leq M \leq (N-3)/2$ where N represents the number of said carrier waves appearing during a half period of said staircase waveform and is an odd integer not smaller than 7.

2. An apparatus for controlling a pulse width modulation inverter, comprising:
a carrier wave generator circuit for generating a carrier wave having a predetermined frequency and amplitude;
an absolute value circuit for forming an absolute value wave signal the amplitude of which represents the absolute value of said carrier signal;
a staircase level generator for generating a plurality of staircase levels;
a comparator for comparing the amplitude of said absolute value wave signal with the amplitudes of said staircase levels and producing a plurality of comparator output signals representing the results of the respective comparisons between the absolute value wave signal and the different staircase levels;
a rectangular wave signal generator for generating a rectangular wave signal with a predetermined period corresponding to a period of said carrier wave;
a ring counter for receiving said rectangular wave signal and producing in accordance with said rectangular wave signal an output signal defining a first period for a modulating signal and output signals defining a plurality of staircase periods within said first period for selecting different ones of said comparator output signals during respective staircase periods; and
a firing circuit coupled to receive said comparator output signals and said ring counter output signals for selecting predetermined ones of said comparator output signals during said first period in accordance with said output signals defining a plurality of staircase periods, and for generating a pulse width modulating signal in accordance with said selection of comparator output signals and applying said pulse width modulating signal to switching elements constituing said inverter,
wherein the staircase periods are determined to provide a staircase waveform within said first period for said modulating signal based on the selection of said comparator output signals by said firing circuit, wherein said staircase waveform is defined by a relationship of $2 \leq M \leq (N-3)/2$ where M is an integer number of staircase steps during half a period of said staircase waveform, and N is the number of carrier waveforms appearing during a half period of said staircase waveform and is an odd integer not smaller than 7.

* * * * *